United States Patent
Yip et al.

(10) Patent No.: US 6,954,436 B1
(45) Date of Patent: Oct. 11, 2005

(54) METHOD AND APPARATUS FOR SELECTING REDUNDANT ROUTERS USING TRACKING

(75) Inventors: Michael Yip, Sunnyvale, CA (US); Apoorva Bhatt, Belmont, CA (US)

(73) Assignee: Extreme Networks, Inc., Santa Clara, CA (US)

( * ) Notice: Subject to any disclaimer, the term of this patent is extended or adjusted under 35 U.S.C. 154(b) by 806 days.

(21) Appl. No.: 09/797,475

(22) Filed: Feb. 28, 2001

(51) Int. Cl.[7] ............................................. H04L 12/28
(52) U.S. Cl. ...................... 370/254; 370/217; 370/252; 370/352; 714/4; 709/208; 709/220; 709/221; 709/238
(58) Field of Search ................................ 370/217–220, 370/241–244, 250–254, 351, 352, 397, 401, 370/409; 714/1–4; 709/208, 220, 221, 238

(56) References Cited

U.S. PATENT DOCUMENTS

| | | | | |
|---|---|---|---|---|
| 5,473,599 A | * | 12/1995 | Li et al. ...................... | 370/219 |
| 5,822,361 A | * | 10/1998 | Nakamura et al. ........... | 375/133 |
| 6,148,410 A | * | 11/2000 | Baskey et al. ................. | 714/4 |
| 6,397,260 B1 | * | 5/2002 | Wils et al. ................... | 709/238 |
| 6,751,191 B1 | * | 6/2004 | Kanekar et al. ............ | 370/217 |
| 6,754,220 B1 | * | 6/2004 | Lamberton et al. ......... | 370/401 |
| 2001/0048661 A1 | * | 12/2001 | Clear et al. ................. | 370/218 |
| 2002/0080752 A1 | * | 6/2002 | Johansson et al. .......... | 370/338 |

OTHER PUBLICATIONS

IETF RFC 2338 http://www.ietf.org/rfc.html*

* cited by examiner

*Primary Examiner*—Steven Nguyen
*Assistant Examiner*—Clemence Han
(74) *Attorney, Agent, or Firm*—Blakely, Sokoloff, Taylor & Zafman LLP

(57) ABSTRACT

A method for electing a master router in a virtual router network by obtaining a tracking parameter for each of the routers participating in a virtual router network. A priority value is assigned to each of the plurality of routers based on the tracking parameter and reported to each router at periodic intervals. The router with the highest priority value is elected, or re-elected, as the new master. The tracking parameters include a ping tracking parameter obtained by pinging the active routes listed in the routing table for each of the of routers participating in the virtual router network, an environmental tracking parameter obtained by inspecting the operating characteristics outside of the control of the router, including operating temperature and power supply status, and a diagnostic tracking parameter obtained by inspecting the diagnostic data representing operating characteristics within the control of the router, including an operability status of the router's circuitry and channels and a status of the packet-level connectivity to the physical layer backplane network.

28 Claims, 4 Drawing Sheets

METHOD AND APPARATUS FOR SELECTING REDUNDANT ROUTERS USING TRACKING

BACKGROUND OF THE INVENTION

1. Field of the Invention

The present invention relates to the field of network management technologies. In particular, the present invention relates to the election of a master router in a redundant router protocol by tracking external events.

2. Background Information and Description of Related Art

The use of standby routers in an Internet Protocol (IP) network is known in the art. The Internet Engineering Task Force (IETF) has published a draft standard protocol for using standby routers, also referred to as redundant routers, entitled *Virtual Router Redundancy Protocol*, version 2-05, on Jan. 5, 2000 (VRRP).

In a typical network configuration, end-hosts that are connected to a layer-2 domain communicate with other subnets through the use of a default router. Often, the default router is statically configured as it minimizes configuration and processing overhead on the end-host and is widely supported by most Internet Protocol (IP) networks. As noted by the IETF, one of the drawback s of using a, statically configured default router is that it creates a single point of failure. Therefore, loss of the default router results in a catastrophic event, isolating all end-hosts that are unable to detect any alternate path that may be available. The use of standby routers (redundant routers) eliminates the single point of failure inherent in the static default routed environment. (VRRP, Section 1, Introduction).

Protocols for using standby routers involve the notion of a virtual router. A virtual router is an abstract object managed by a standby router protocol (SRP), and it functions as a default router for end-hosts on a network. The virtual router is defined by a Virtual Router Identifier (VRID) and a set of associated IP addresses. The virtual router may be implemented with two or more routers running the SRP. The SRP specifies an election process whereby the responsibility for forwarding packets sent to the IP address(es) associated with the virtual router is dynamically assigned to one of the SRP routers, called the master. The remaining SRP routers are referred to as backup or slave routers, and are available to assume forwarding responsibility for a virtual router should the current master fail.

Under the IETF's VRRP, the election process is based on the relative value of the priority field reported for each SRP router for a given VRID. The priority field may be an 8-bit unsigned integer field as set forth in the IETF's VRRP, Section 5.3.4. Higher values equal higher priority. The value of the priority field reported for the SRP router that owns the IP address(es) for a given VRID, i.e. the master SRP router, is always the highest priority value of 255. The value of the priority field reported for the backup SRP router(s) is a value from 1 to 254. The default priority field for a backup SRP router is 100. A value of zero in the priority field has a special meaning, and indicates that the SRP router has stopped participating in the SRP. This triggers the SRP backup router(s) to quickly elect one of among them transition to master status without waiting for the current master to timeout.

The determination of a priority for a particular SRP router may vary widely depending on the election process of the particular protocol in use and the policies set by network management. The efficiency of the transition from backup to master will depend in large part on how those priorities are determined. It would be desirable, therefore, to devise an SRP election process that takes into account a large number of operation scenarios such that the transition is as smooth and efficient as possible, and avoids erroneously electing a master SRP router that cannot communicate with the outside world.

SUMMARY

According to one aspect of the invention, a method and system is provided for electing an SRP master router from one or more routers participating in the SRP protocol using tracking parameters. The master SRP router functions as the default router for the subnet associated with the virtual router. The remaining SRP routers function as backup SRP routers, also referred to as slave routers, standing by to become the master SRP router if the current master is not re-elected. The tracking parameters include a ping tracking parameter that represents the metric of the active routes that can accept packets from an SRP router, an environmental parameter that represents the metric of the state of the operational environment of the SRP router, and a diagnostic parameter that represents the metric of the state of the functionality of SRP router.

According to another aspect of the invention, the SRP routers trade packet data at certain time intervals containing the priority field values that reflect their current tracking parameters in the form of protocol data units (PDUs). The SRP election process uses the priority field values to arbitrate the election of the master SRP router for a given virtual router ID (VRID). If, as a result of the tracking parameters, the election process determines that the backup (slave) has a higher priority than the master, then the master SRP router relinquishes control of its master status, and the backup (slave) with the highest priority is elected to be the next master SRP router.

According to another aspect of the invention, the priority field values reflecting the tracking parameters may be pre-determined by the network administrator. The priority field values reflecting the environmental and diagnostic tracking parameters may be set to an automatic fail-over level when necessary (i.e. a forced takeover by the standby router). Similarly, the priority field values reflecting the ping tracking parameters may be set to force the router to standby status when ping tracking of certain critical addresses fails.

In accordance with other aspects of the present invention, apparatus are provided for carrying out the above and other methods.

BRIEF DESCRIPTION OF DRAWINGS

The present invention will be described by way of exemplary embodiments, but not limitations, illustrated in the accompanying drawings in which like references denote similar elements, and in which.

DETAILED DESCRIPTION OF THE INVENTION

In the following description various aspects of the present invention, a method for selecting redundant routers using tracking, will be described. Specific details will be set forth in order to provide a thorough understanding of the present invention. However, it will be apparent to those skilled in the art that the present invention may be practiced with only some or all of the described aspects of the present invention, and with or without some or all of the specific details. In some instances, well known architectures, steps, and techniques have not been shown to avoid unnecessarily obscuring the present invention. For example, specific details are not provided as to whether the method and system is implemented in a router, server or gateway, as a software routine, hardware circuit, firmware, or a combination thereof.

Various operations will be described as multiple discrete steps performed in turn in a manner that is most helpful in understanding the present invention. However, the order of description should not be construed as to imply that these operations are necessarily performed in the order they are presented, or even order dependent. Lastly, repeated usage of the phrase "in one embodiment" does not necessarily refer to the same embodiment, although it may.

Figure 1:
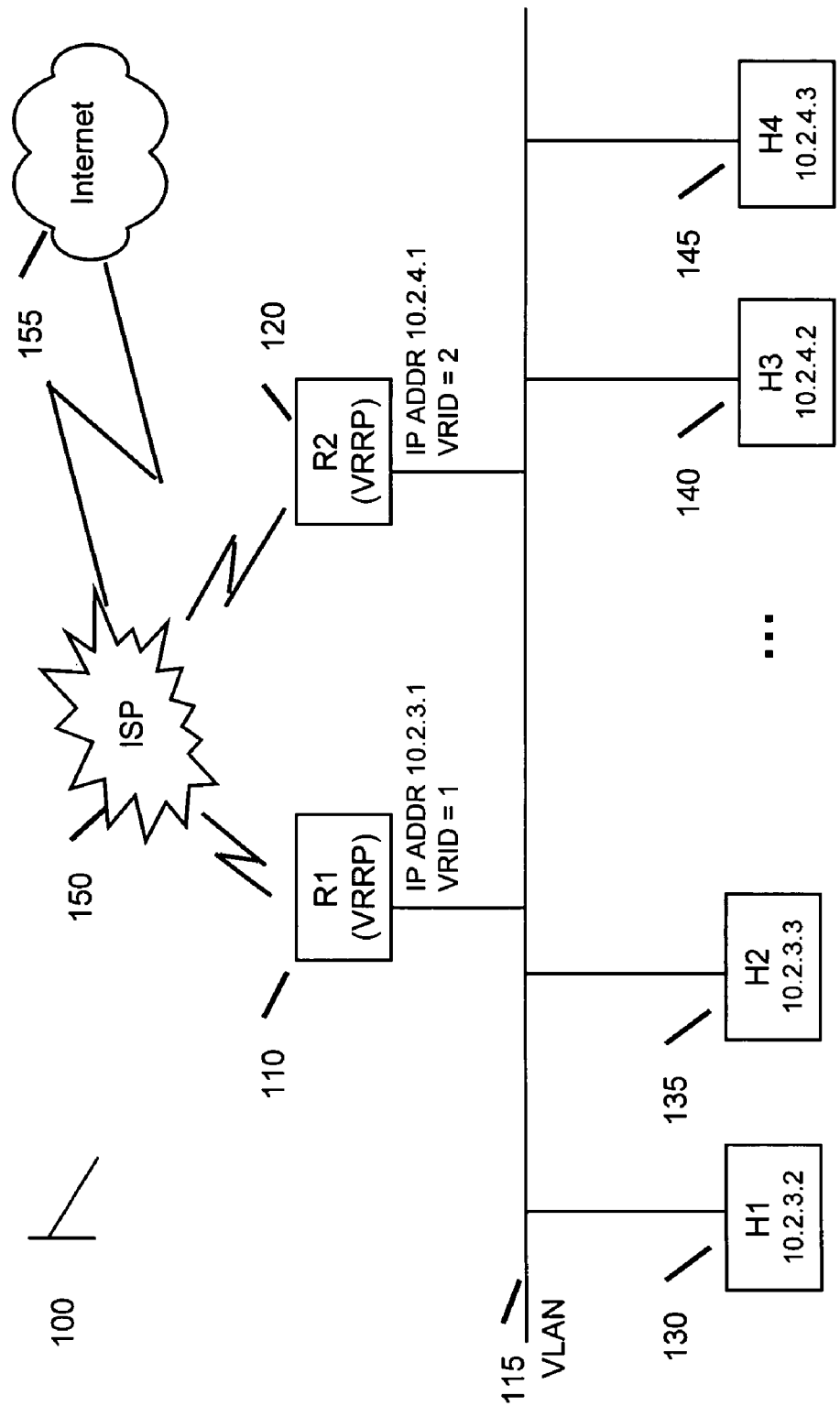
FIG. 1 illustrates a block diagram of a typical prior art network configuration using the virtual redundant router protocol (VRRP)

Referring now to FIG. 1, wherein a block diagram illustrating a typical prior art network configuration using the IETF virtual redundant router protocol (VRRP) is shown. As illustrated, routers R1 110 and R2 120 are defined as VRRP routers connected to a local area network (LAN) 115 supporting virtual routers VRID1 and VRID2. VRID1 is defined as the virtual router associated with IP subnet 10.2.3.1, and VRD2 is defined as the virtual router associated with IP subnet 10.2.4.1. Hosts H1 130 and H2 135 have configured a static default route throu R1 's IP address 10.2.3.1, and hosts H3 140 and H4 145 have configured a static default route through R2's IP address 10.2.4.1. R1 110 is the initial master for VRID1 and R2 120 is the backup (slave) router. Likewise, R2 is the initial master for VRID2 and R1 is the backup (slave) router. Thus, if R1 110 fails such as when the R1 ISP 150 connection to the Internet 155 goes down, then R2 120 is elected the new master VRRP router for VRID1, and publishes the new subnet route 10.2.4.1 for hosts H1 130 and H2 135. Likewise, if R2 120 fails, then R1 110 is elected the new master VRRP router for VRID2, and publishes the new subnet route 10.2.3.1 for hosts H3 140 and H4 145. The election of the new master VRRP router is performed in accordance with the election process defined for the IETF VRRP protocol.

Figure 2:
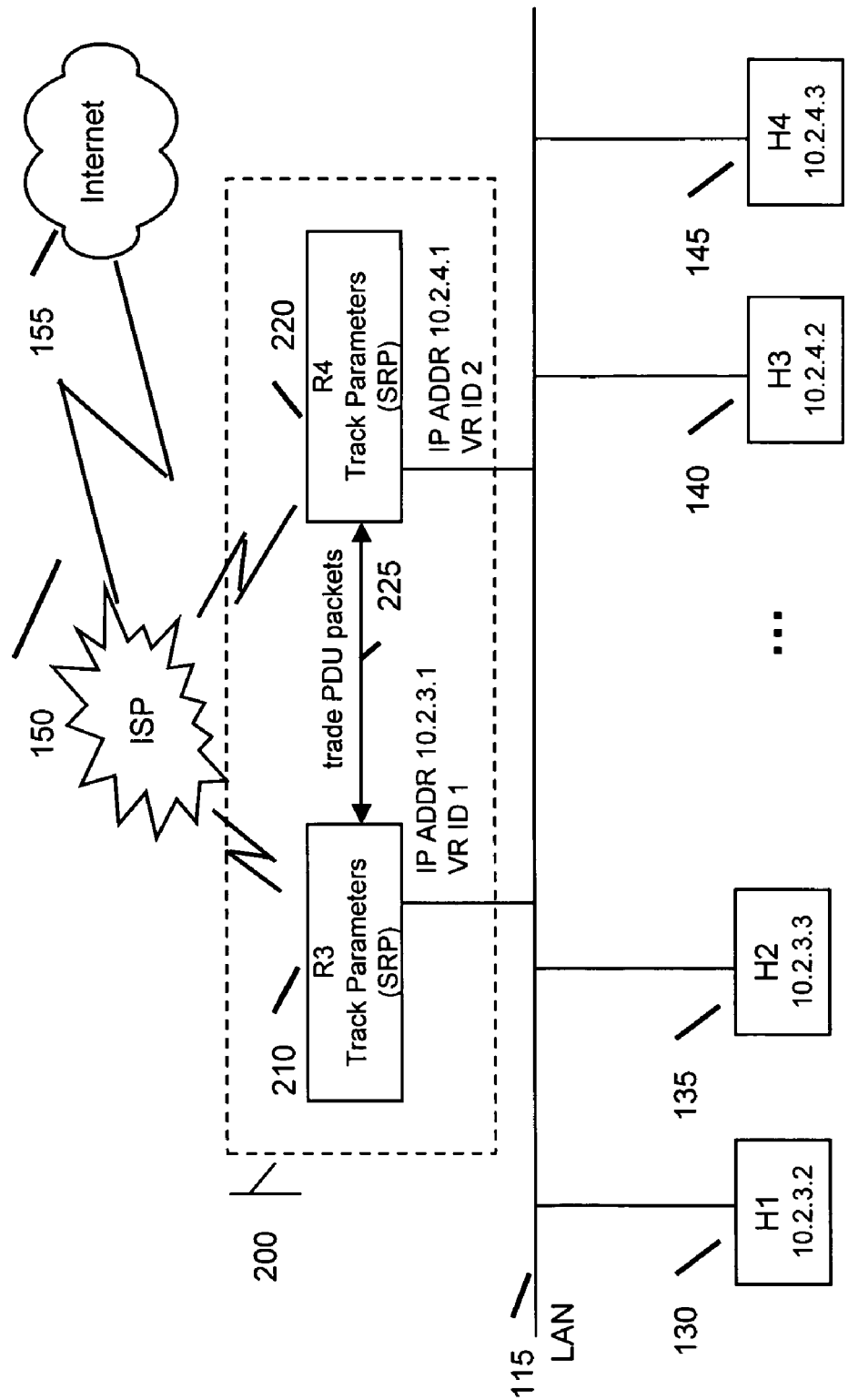
FIG. 2 illustrates a block diagram of a network configuration using a standby router protocol in accordance with one embodiment of the present invention.

Referring now to FIG. 2, wherein a block diagram illustrating a network configuration 200 using a standby router protocol (SRP) in accordance with one embodiment of the present invention. As illustrated, routers R3 210 and R4 120 are defined as SRP routers connected to a local area network (LAN) 115 supporting virtual routers VRID1 and VRID2. As before, VRID1 is defined as the virtual router associated with IP subnet 10.2.3, and VRD2 is defined as the virtual router associated with IP subnet 10.2.4. Each IP subnet may be configured as a virtual LAN (VLAN). Hosts H1 130 and H2 135 have configured a static default route through R3's IP address 10.2.3.1, and hosts H3 140 and H4 145 have configured a static default route through R4's IP address 10.2.4.1. R2 210 is the initial master for VRID1 and R4 220 is the backup (slave) router. Likewise, R4 220 is the initial master for VRID2 and R3 210 is the backup (slave) router.

Each router R3 210 and R4 220, is configured to run an SRP protocol in accordance with one embodiment of the invention. Although only two SRP routers are shown in the illustrated embodiment, additional SRP routers may be added to increase the level of redundancy. In one embodiment each router is a switch that is physically connected to the same layer-2 domain and the rest of the network 115. Each switch is configured with the same subnet information of the VLANs they are sharing so that either switch is capable of functioning as the default router for a given VLAN. Initially, one switch will be elected as the master SRP router, and the other will be the backup (slave). For example, with reference to the illustrated embodiment, R3 210 is the master SRP router for VRID1. As the master, R3 functions as the default router for the subnet 10.2.3 associated with hosts H1 and H2. It will handle all the data traffic for hosts H1 and H2 and export the subnet route for H1 and H2 to other routers. Likewise, R4 220 is the master SRP router for VRID2. Thus, both VRID1 and VRID2 are each served by a master and a backup (slave).

In operation, R3 210 and R4 220 periodically trade SRP protocol data units (PDUs) 225 with each other at specified time intervals. The SRP protocol data units contain the priority values that reflect the SRP tracking parameters obtained for the routers R3 and R4. The tracking parameters contain information about There are three types of SRP tracking parameters.

The first tracking parameter is a ping tracking parameter. The ping tracking parameter is obtained by pinging the IP addresses of interest as listed in the router's SRP Configuration table. The network administrator is responsible for configuring the IP addresses of interest, which are typically those addresses critical to the network, e.g. the SRP router's default gateway, if any, or a critical File Server that the hosts are likely to access frequently, etc. The value of the ping tracking parameter is the number of successful pings of IP addresses that respond that they are alive and capable of receiving traffic from the SRP router.

The second tracking parameter is the environmental tracking parameter. The environmental tracking parameter is obtained by inspecting the operational environment of the SRP router. The operational environment is quantified in measurements or statuses of environmental characteristics that are outside of the control of the SRP router, and includes but is not limited to the operating temperature of the SRP router as well as the status and temperature of its power supply and the fan.

The third tracking parameter is the diagnostics tracking parameter. The diagnostics tracking parameter is obtained by inspecting the diagnostic data provided by the SRP router about the router hardware and connectivity. The diagnostic data is quantified in measurements or statuses of router characteristics that are within the control of the SRP router, and includes but is not limited to the operability status of the router circuitry and channels as well as the packet-level connectivity to the physical layer backplane network.

If the SRP tracking parameters for either of the SRP routers R3 210 and R4 220 indicate that a new master must be elected, than an election process compares the relative priority values of the SRP routers R3 210 and R4 220 and elects the one with the highest priority value. For example, in one embodiment, if R4's priority values are decreased due to ping tracking parameter values which indicate that certain active routes on R4 220 are not responding to the ping, then R3 210 may have higher priority values than R4 220 and may be elected to assume the master router function for virtual router VRID2 serving subnet 10.2.4. An election process is performed, and upon election of R3 210 to be the master router for virtual router VRID2, R3 210 sends the new subnet route for hosts H3 140 and H4 145 to other routers on the network, and commences default routing. In this scenario, R3 210 will be the master for both virtual routers VRID1 and VRID2.

Figure 3:
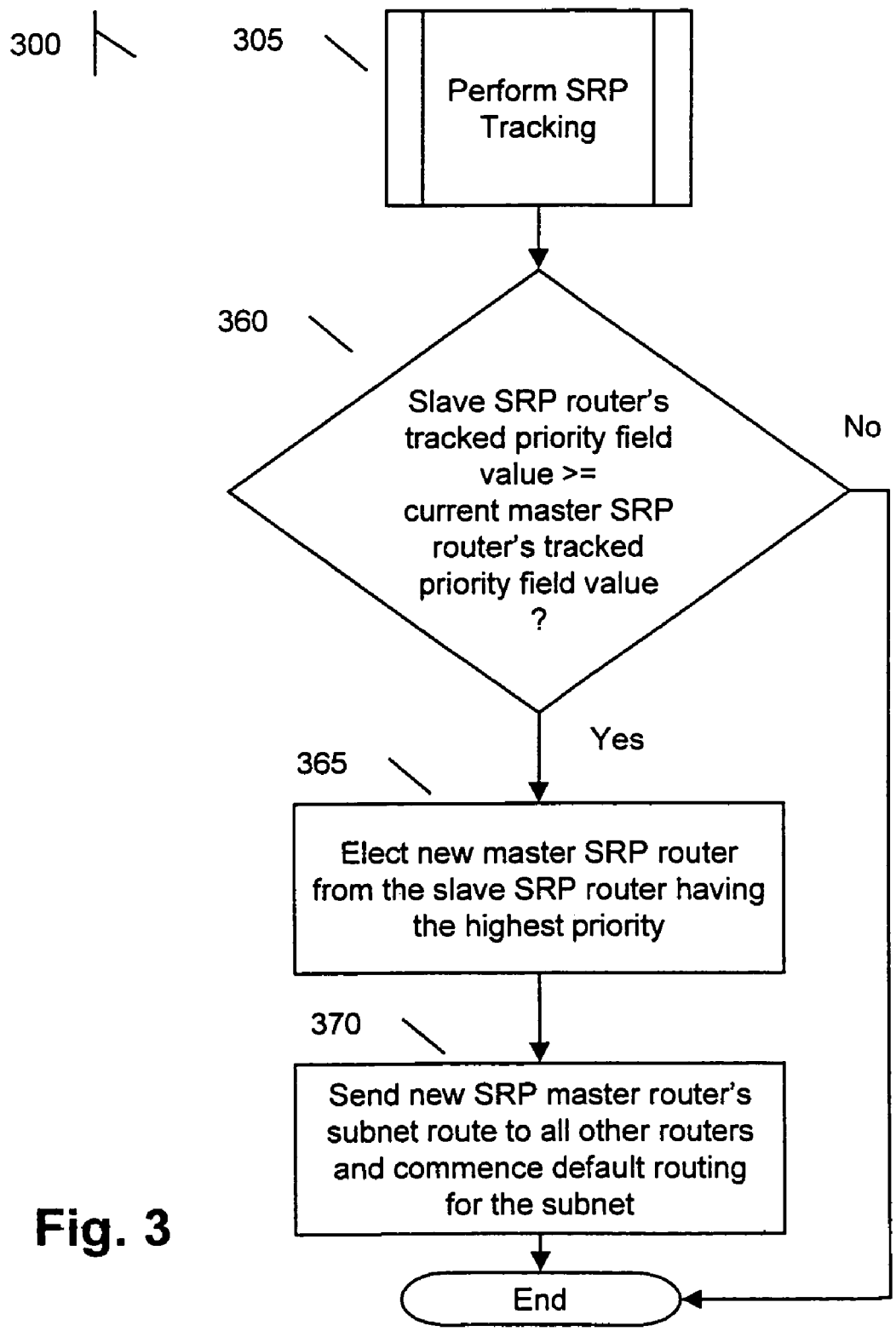
FIG. 3 illustrates a flow diagram of the election of a master SRP router for a virtual router in accordance with one embodiment the present invention.
Figure 4:
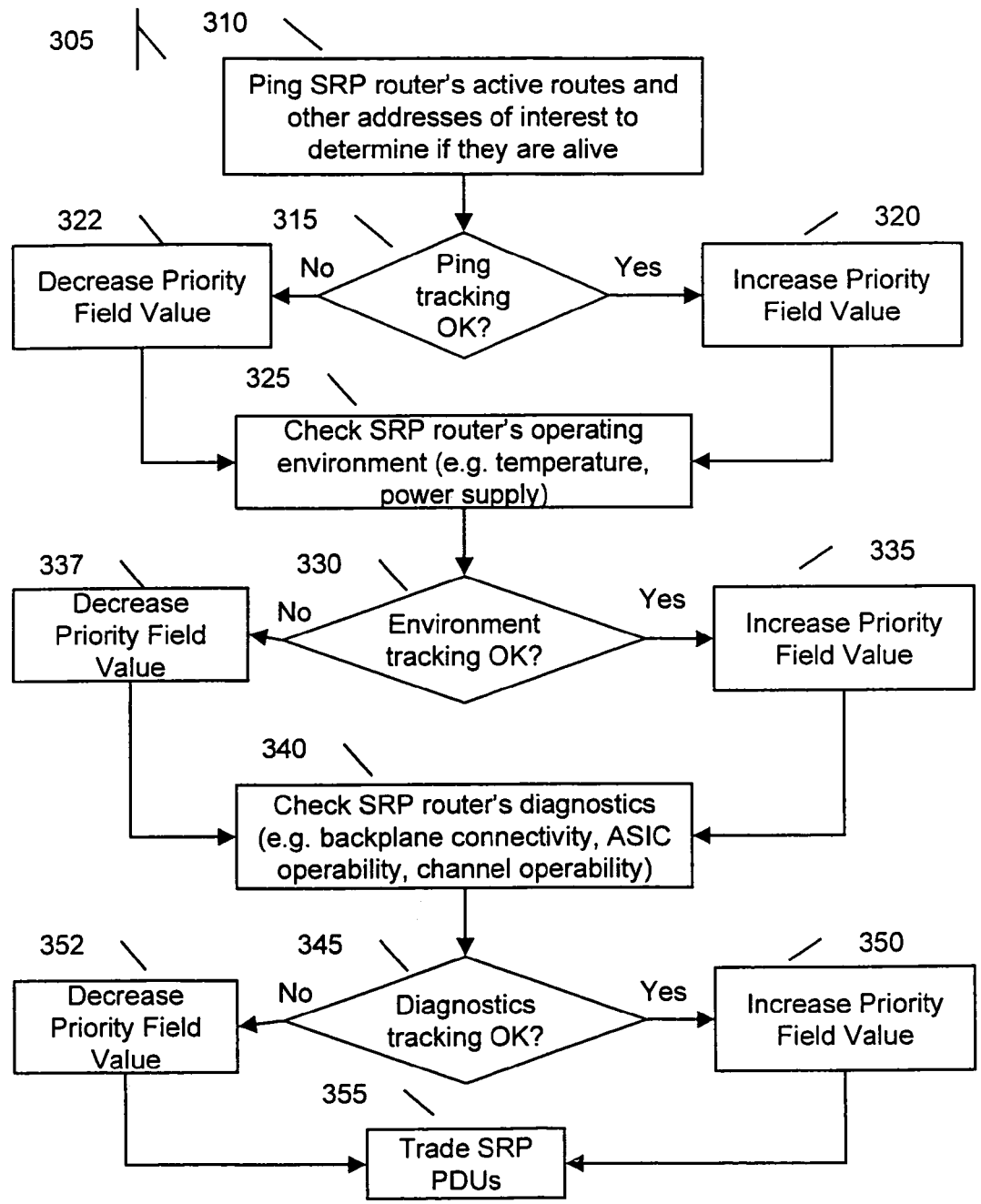
FIG. 4 illustrates a flow diagram of the SRP tracking of an SRP router in preparation for the election of the master SRP

Referring now to FIGS. 3a–3b, wherein a flow diagram of the election 300 of a master SRP router for a virtual router in accordance with one embodiment the present invention is illustrated. As shown, in block 305, the SRP tracking is performed periodically at certain time intervals to obtain tracking parameters for the SRP routers participating in the SRP protocol for a given virtual router, e.g. VRID1.

As illustrated in further detail in FIG. 3b, at process block 310, each SRP router pings its active routes to determine if they are alive, i.e. capable of receiving data packets. The number of live routes is quantified in a metric that reflects a priority field value. In one embodiment, the network manager may designate certain critical routes that must be alive in order for the SRP router to be a master. If those routes are not alive at block 315, then the priority field value for this SRP router may be decreased at block 322 to a special value to prevent this SRP router from being elected master. If the routes are alive, then the priority field value for this SRP router may be increased at block 320.

At block 325 the SRP tracking process continues by checking the SRP router's operating environment, such as the temperature of the router hardware and status of the power supply. If the operating environment is determined to be unacceptable at block 330, then the priority field value may be decreased or even set to a special value at block 337 to prevent this SRP router from being elected master. If the operating environment is satisfactory, then the priority field value for this SRP router may be increased at block 335.

At block 340 the SRP tracking process continues by checking the SRP router's diagnostics, such as the connectivity to the physical layer, or the reliability of the router's circuitry. If the diagnostics are determined to be unacceptable at block 345, then the priority field value may be decreased or even set to a special value at block 352 to prevent this SRP router from being elected master. If the diagnostics are determined to be satisfactory, then the priority field value for this SRP router may be increased at block 350. Finally, the SRP routers generate packets in the form of protocol data units (PDUs) that contain the priority field values set in the preceding blocks. At block 355, the SRP router trades its PDUs with those of other SRP routers participating in the SRP protocol for a given virtual router ID.

In one embodiment, the special value of the priority field that prevents an SRP router from being elected to the master SRP router is 255, while in an alternative embodiment it is zero. Moreover, the designation of certain priority field values for certain tracking parameters may be set by the network administrator to conform to network policy. Thus, for example, certain SRP routers may be taken out of service when one or more of the tracking parameters meet predefined criteria set by the network administrator, such as the minimum number of live routes before allowing an SRP router to be elected the master router. It should be further noted that in one embodiment a network administrator may configure the order of obtaining the SRP tracking parameters differently for each SRP router, or the order may be predefined to occur in a different sequence than described above without departing from the spirit of the invention.

Returning now to FIG. 3a, at block 360, the election process is performed by comparing the relative values of the tracked priority fields for each of the SRP routers for a given VRID. If any of the slave SRP routers' tracked priority field values are greater than or equal to the current master SRP router's tracked priority field value, then an election 365 is triggered to determine which of the slave/backup routers participating in the virtual network has the highest priority. At block 370, the newly elected master SRP router sends its subnet route to all of the other routers, and commences default routing for the subnet once the old master SRP router times out.

Accordingly, a novel method and system is described for a standby router protocol that provides an improved master election process using tracking. From the foregoing description, those skilled in the art will recognize that many other variations of the present invention are possible. In particular, while the present invention has been described as being implemented in a network comprising one or more routers R3 210 and R4 220, some of the logic may be distributed in other components of a network or internetwork application.

For example, embodiments of the invention may be represented as a software product stored on a machine-accessible medium (also referred to as a machine or computer-readable medium, or a processor-readable medium). The machine-accessible medium may be any type of magnetic, optical, or electrical storage medium including a diskette, CD-ROM, memory device (volatile or non-volatile), or similar storage mechanism. The machine-accessible medium may contain various sets of instructions, code sequences, configuration information, or other data. As an example, the procedures described herein for an election process 300 and the performance of SRP tracking 305 in an SRP protocol can be stored on the machine-accessible medium. Those of ordinary skill in the art will appreciate that other instructions and operations necessary to implement the described invention may also be stored on the machine-accessible medium.

Thus, the present invention is not limited by the details described. Instead, the present invention can be practiced with modifications and alterations within the spirit and scope of the appended claims.

What is claimed is:

1. A method performed in a router comprising:
   obtaining multiple tracking parameters;
   assigning a priority value based on the multiple tracking parameters;
   communicating the priority value to each of a plurality of routers;
   receiving priority values from each of the plurality of routers; and
   assuming the role of master router if the priority value is greater than each of the priority values received from the plurality of routers.

2. The method of claim 1, wherein one of the tracking parameters is a ping tracking parameter obtained by pinging the Internet Protocol (IP) addresses of interest listed in a configuration table for each of the plurality of routers participating in a virtual router network, and where the value of the ping tracking parameter is a metric representing the number of IP addresses that respond to the ping that they are alive and capable of receiving data packets from the pinging router.

3. The method of claim 1, wherein one of the tracking parameters is an environmental tracking parameter obtained by inspecting the operational environment for each of the plurality of routers participating in a virtual router network, the operational environment representing operating characteristics outside of the control of the router.

4. The method of claim 3, wherein the operating characteristics outside of the control of the router include a measurement of the router's temperature and a status of the router's power supply, and where the value of the environmental tracking parameter is a metric representing the temperature measurement and the power supply status.

5. The method of claim 1, wherein one of the tracking parameters is a diagnostic tracking parameter obtained by inspecting the diagnostic data provided for each of the plurality of routers participating in a virtual router network, the diagnostic data representing operating characteristics within the control of the router.

6. The method of claim 5, wherein the operating characteristics within the control of the router, include an operability status of the router's circuitry and channels and a status of the packet-level connectivity to the physical layer backplane network, and where the value of the diagnostic data parameter is a metric representing the router's operability status and the packet-level connectivity.

7. The method of claim 1, wherein the priority value is a decimal number ranging from 0 to 255, wherein the values of 0 and 255 are special values indicating that an immediate election of a new master is warranted.

8. The method of claim 7, wherein the special value 0 indicates that this router is ineligible to be elected the master.

9. The method of claim 7, wherein the special value 255 indicates that this router is ineligible to be elected the master.

10. The method of claim 7, wherein the special value 255 indicates that this router must be elected the master.

11. The method of claim 7, wherein the values ranging from 1 to 254 indicate that this router may be elected the master in accordance with the priority values of each of the plurality of routers participating in a virtual router network.

12. The method of claim 1, wherein communicating is performed at periodic intervals, and wherein a router's failure to communicate at periodic intervals results in that router becoming ineligible for election to the master router.

13. The method of claim 1, wherein the priority value that is assigned based on a ping tracking parameter is restricted to a decimal number ranging from 1 to 254, wherein the values of 1 to 254 indicate that this router may be elected the master in accordance with the priority values of each of the plurality of routers participating in a virtual router network.

14. An apparatus for controlling processing of data packets, comprising:
   a means for obtaining multiple tracking parameters;
   a means for assigning a priority value based on the multiple tracking parameters;
   a means for communicating the priority value to each of a plurality of routers;
   a means for receiving priority values from each of the plurality of routers; and
   a means for assuming the role of master router if the priority value is greater than each of the priority values received from the plurality of routers.

15. The apparatus of claim 14, wherein one of the tracking parameters is a ping tracking parameter obtained by pinging the IP addresses of interest listed in a configuration table for each of the plurality of routers participating in a virtual router network, and where the value of the ping tracking parameter is a metric representing the number of IP addresses that respond to the ping that they are alive and capable of receiving data packets from the pinging router.

16. The apparatus of claim 14, wherein one of the tracking parameters is an environmental tracking parameter obtained by inspecting the operational environment for each of the plurality of routers participating in a virtual router network, the operational environment representing operating characteristics outside of the control of the router.

17. The apparatus of claim 16, wherein the operating characteristics outside of the control of the router include a measurement of the router's temperature and a status of the router's power supply, and where the value of the environmental tracking parameter is a metric representing the temperature measurement and the power supply status.

18. The apparatus of claim 14, wherein one of the tracking parameters is a diagnostic tracking parameter obtained by inspecting the diagnostic data provided for each of the plurality of routers participating in a virtual router network, the diagnostic data representing operating characteristics within the control of the router.

19. The apparatus of claim 18, wherein the operating characteristics within the control of the router, include an operability status of the router's circuitry and channels and a status of the packet-level connectivity to the physical layer backplane network, and where the value of the diagnostic data parameter is a metric representing the router's operability status and the packet-level connectivity.

20. The apparatus of claim 14, wherein the priority value is a decimal number ranging from 0 to 255, wherein the values of 0 and 255 are special values indicating that an immediate election of a new master is warranted.

21. The apparatus of claim 20, wherein the special value 0 indicates that this router is ineligible to be elected the master.

22. The apparatus of claim 20, wherein the special value 255 indicates that this router is ineligible to be elected the master.

23. The apparatus of claim 20, wherein the special value 255 indicates that this router must be elected the master.

24. The apparatus of claim 20, wherein the values ranging from 1 to 254 indicate that this router may be elected the master in accordance with the priority values of each of the plurality of routers participating in a virtual router network.

25. The apparatus of claim 14, wherein communicating is performed at periodic intervals, and wherein a router's failure to communicate at periodic intervals results in that router becoming ineligible for election to the master router.

26. An article of manufacture comprising:
   a machine-accessible medium having stored thereon a plurality of instructions to cause a router to perform the steps of:
   obtaining multiple tracking parameters;
   assigning a priority value based on the multiple tracking parameters;
   communicating the priority value to each of a plurality of routers;
   receiving priority values from each of the plurality of routers; and
   assuming the role of master router if the priority value is greater than each of the priority values received from the plurality of routers.

27. A switch comprising:
   a tracking logic that obtains multiple tracking parameters;
   a prioritizer logic that assigns a priority value based on the multiple tracking parameters;
   a communicating logic that sends the priority values to each of a plurality of switches;
   a communicating logic that receives priority values from each of the plurality of switches; and an election arbitrator that instructs the switch to assume the role of master router if its priority value is higher than each of the priority values received from the plurality of switches.

28. A system comprising:
a plurality of routers, each router comprising:
a tracking module to obtain multiple tracking parameters;
a priority module to assign a priority value based on the multiple tracking parameters;
a communication module to communicate the priority value to each of the plurality of routers; and
a communication module to receive priority values from each of the plurality of routers;
an election arbitrator to elect one of the plurality of routers to the master router based on the priority values of the plurality of routers.

* * * * *